United States Patent
Kopis

[11] Patent Number: 5,937,787
[45] Date of Patent: Aug. 17, 1999

[54] AUTOMATIC FEEDER AND CONTROL SYSTEM

[76] Inventor: Francis G. Kopis, 7904 Birchdale Ave., Elmwood Park, Ill. 60707

[21] Appl. No.: 09/131,461

[22] Filed: Aug. 10, 1998

Related U.S. Application Data
[60] Provisional application No. 60/055,737, Aug. 13, 1997.

[51] Int. Cl.⁶ .................................................. A01K 61/02
[52] U.S. Cl. ................... 119/57.8; 119/52.2; 119/57.1
[58] Field of Search .................. 119/52.1, 56.1, 119/52.2, 57.8, 57.1, 57.4

[56] References Cited

U.S. PATENT DOCUMENTS

| | | | |
|---|---|---|---|
| 2,275,887 | 3/1942 | Chandler | 119/52.1 |
| 2,563,321 | 8/1951 | Dugan | 119/52.1 |
| 3,653,361 | 4/1972 | Holliday | 119/52.1 |
| 4,183,923 | 1/1980 | Sabbara | 119/56.1 |
| 4,526,134 | 7/1985 | Sapp | 119/51.13 |
| 4,953,503 | 9/1990 | Lundquist | 119/51.01 |
| 5,050,537 | 9/1991 | Fox | 119/56.1 |
| 5,195,460 | 3/1993 | Loken | 119/57.9 |
| 5,259,337 | 11/1993 | Rasmussen | 119/57.1 |
| 5,549,075 | 8/1996 | Golden | 119/57.92 |
| 5,749,316 | 5/1998 | Deagan | 119/57.8 |
| 5,775,256 | 7/1998 | Henshaw | 119/57.8 |

FOREIGN PATENT DOCUMENTS

| | | | |
|---|---|---|---|
| 32148 | 9/1927 | France | 119/57.1 |
| 1419639 | 8/1988 | U.S.S.R. | 119/57.1 |

*Primary Examiner*—Thomas Price
*Assistant Examiner*—Fredrick T. French, III
*Attorney, Agent, or Firm*—Lockwood, Alex, Fitz-Gibbon & Cummings

[57] ABSTRACT

An automatic feeder and control system is provided which transports feed material such as bird food and the like from a reservoir storage compartment and into a feed receptor station which can be substantially vertically above the reservoir storage compartment. An endless belt moves through a tube which generally connects the reservoir storage compartment and the feed receptor station. By the operation of a drive assembly, feed material within the reservoir storage compartment is moved by the endless belt into the feed receptor station.

22 Claims, 5 Drawing Sheets

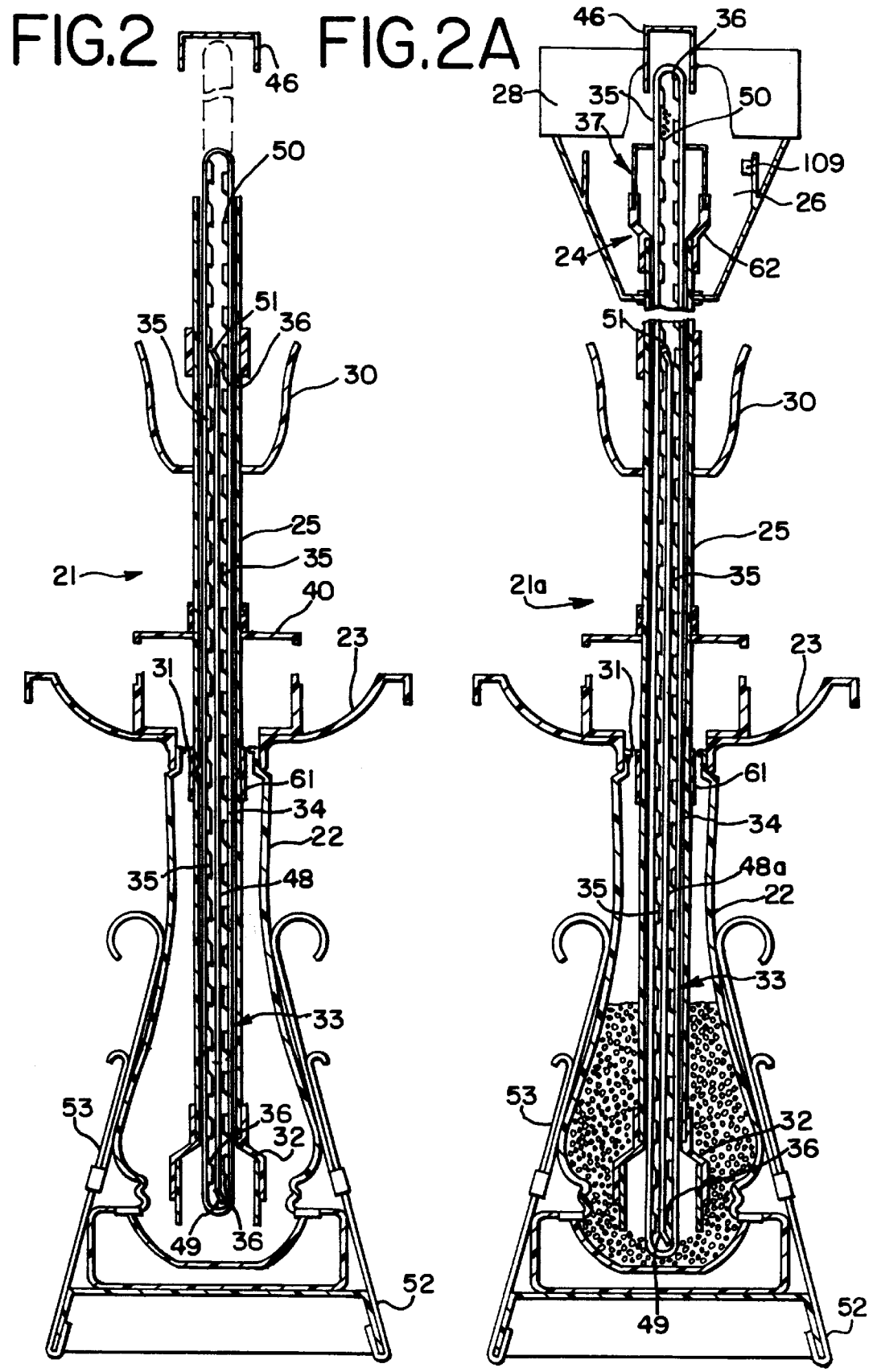

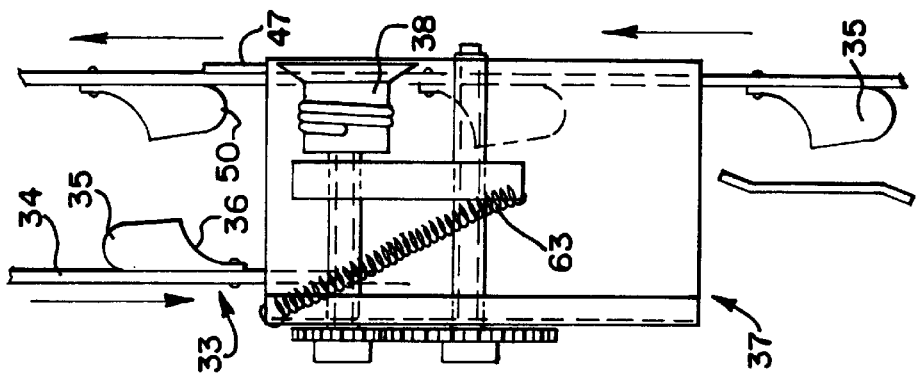
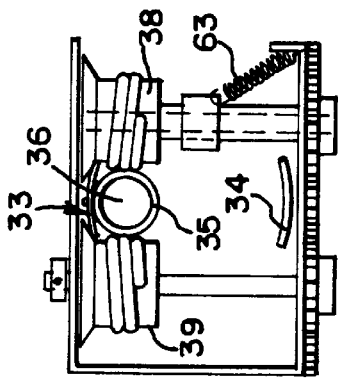
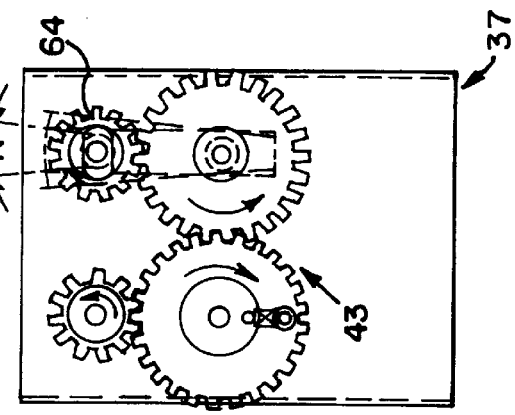
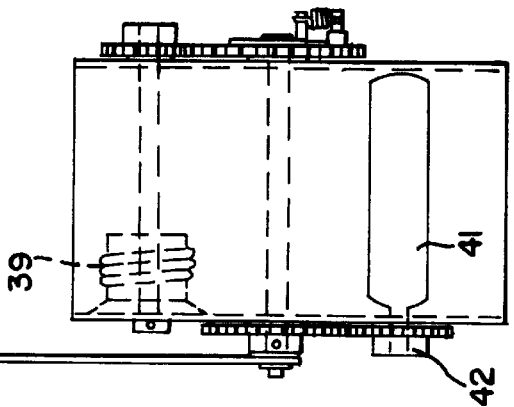
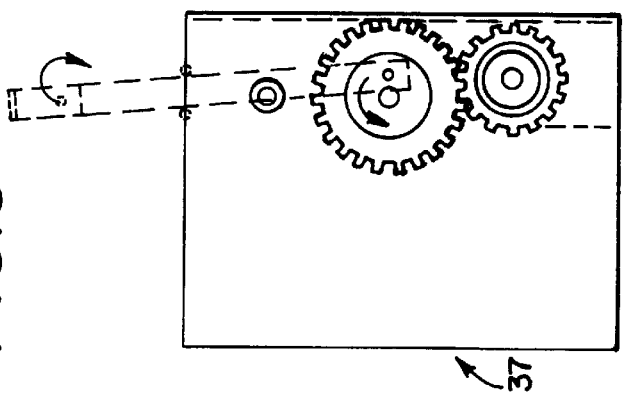

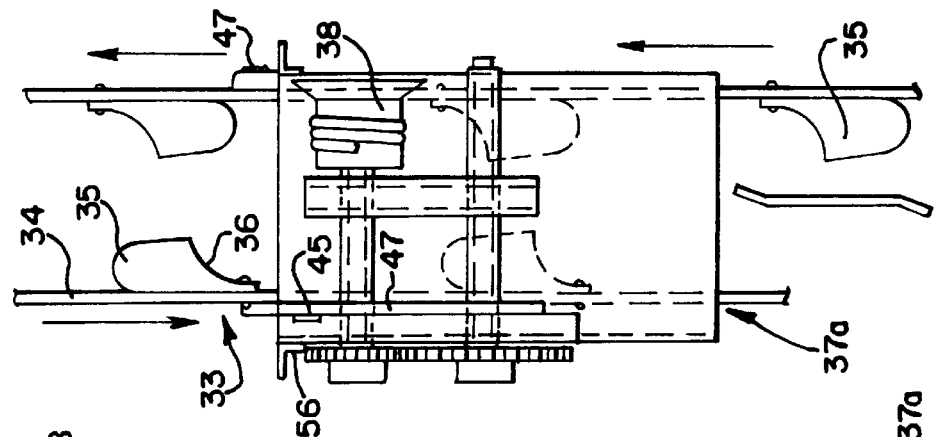
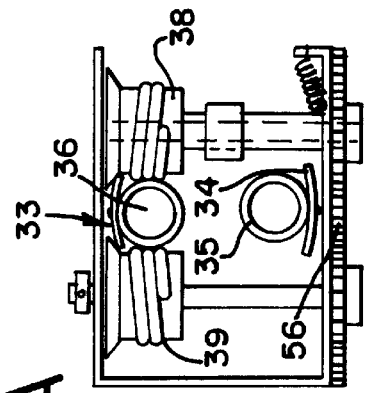
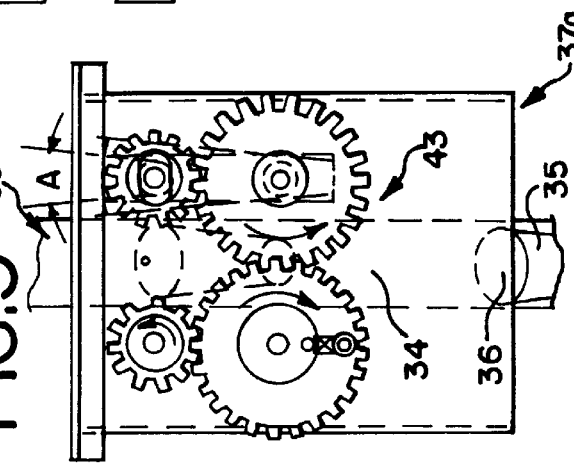
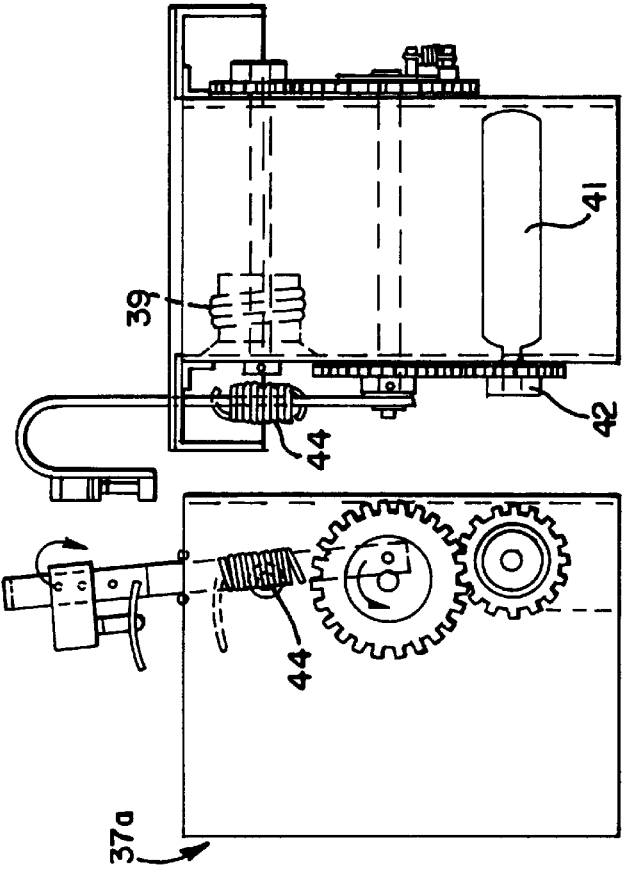

5,937,787

AUTOMATIC FEEDER AND CONTROL SYSTEM

CROSS REFERENCE TO RELATED APPLICATION

This application claims the benefit of, and incorporates by reference the disclosure of, U.S. provisional application Serial No. 60/055,737, filed Aug. 13, 1997.

BACKGROUND OF THE INVENTION

This invention generally relates a feeder for birds and for other uses, which feeder fills itself or operates automatically. More particularly, a feeder is provided which incorporates a control system which is self-contained and which requires only low levels of power, although higher levels can be used if desired. The unit accommodates large volumes of particulate material or feed, including food, such as seed or seed mixtures, or of pellets such as for injection molding, or of liquids such as water. An endless belt delivers the feed from a reservoir up to a feed station positioned at a desired vertical location along the device. The unit automatically replenishes the food supply at the feed station. Preferably the endless belt exhibits freedom of movement by which the belt can accommodate and address blockages and filled compartments.

In the past, the feeding of birds and the like has required a certain level of maintenance. For example, most feeders require the user to periodically fill the storage compartment within the feeder, and the birds access the storage compartment. Once the food is totally depleted or reaches a level at which it is no longer possible for the birds to access the food, the user must refill the storage compartment, typically manually.

The present invention addresses this labor requirement in that the user fills a very large quantity of food into a reservoir which can be remote from the area at which the birds can access the food. The unit then automatically fills the feed station without requiring direct action by the user.

Also, certain vertical conveying operations are needed if one desires to move particulate material or liquids from one level to another. The conveyor aspects of the present invention are useful in addressing these needs.

SUMMARY OF THE INVENTION

In accordance with the present invention, important advances in feeder devices are provided. A large volume of material to be fed is placed within a lower reservoir having an exceptionally large capacity, for example, on the order of three gallons or more of feed. A supported, but substantially trackless endless belt conveys the feed material from this bottom reservoir to a remote station, typically above the reservoir. Feed exit locations are provided at the feed station. Feed is replenished by movement of the endless belt. The replenishment can be on an as-needed basis. The endless belt includes small container members which carry the liquid or particulate feed material such as food or seed to the feed station, at which the liquid or particulate feed material is deposited into the remote station. The control system for moving the endless belt can have a low power requirement which is typically met by battery power, house current, and/or solar power.

It is accordingly a general object of the present invention to provide an improved automatic feeder for particulate material and/or liquid, such as for feeding birds and the like, as well as a control system therefor.

An optional object of the present invention is to provide an improved automatic feeder for birds and the like which is aesthetically pleasing and which typically combines the feeding aspect with a birdbath feeder arrangement and which will accommodate various granular food items such as mixed birdseed.

Another object of the present invention is to provide an improved automatic feeder for birds and the like which preferably includes tiny buckets which bring seed continuously up a tube or tower to an elevated bird feeder location.

An object of an embodiment of the present invention is to provide an improved automatic bird feeder and control system which is easy to load at waist height, while still providing an elevated bird watching line of sight.

An optional object of the present invention is to provide an automatic bird feeder and control system which can incorporate a musical assembly for an added audible feature.

An object of an embodiment of this invention is to provide an automatic bird feeder having a low center of gravity and excellent stability.

An object of an embodiment of the invention is to provide a conveyor system for liquid such as water or for particulates such as polymeric molding pellets which is especially suitable for conveying upwardly.

An object of an embodiment this invention is to provide a birdbath internal column as a storage location for seed or other particulate feed to be conveyed therefrom.

Another object of the invention is to provide a feeder device capable of being broken down into multiple pieces for convenient transportation.

A further object of the invention is to provide a feeder device having a driving mechanism which can be located at any point on the support tube which is above the pickup location.

These and other objects, features and advantages of the present invention will be apparent from and clearly understood through a consideration of the following detailed description.

BRIEF DESCRIPTION OF THE DRAWINGS

In the course of this description, reference will be made to the attached drawings, wherein:

FIG. 2 is an elevational view, partially broken away, of the embodiment as generally shown in FIG. 1;

FIG. 2A is an elevational view similar to FIG. 2 showing another embodiment;

FIG. 3 is a side elevational view of a drive assembly suitable for use in the FIG. 2 illustrated embodiment;

FIG. 4 is an end view of the drive assembly of FIG. 3;

FIG. 5 is another side view of the FIG. 3 illustrated drive assembly, showing a typical gear drive and clutching mechanism;

FIG. 6 is a top plan view of FIG. 5;

FIG. 7 is another end elevational view of the FIG. 3 illustrated drive assembly, showing movement of the endless belt therethrough;

FIGS. 3A, 4A, 5A, 6A and 7A are similar to FIGS. 3–7 showing additional features;

DESCRIPTION OF THE PREFERRED EMBODIMENTS

Figure 1:
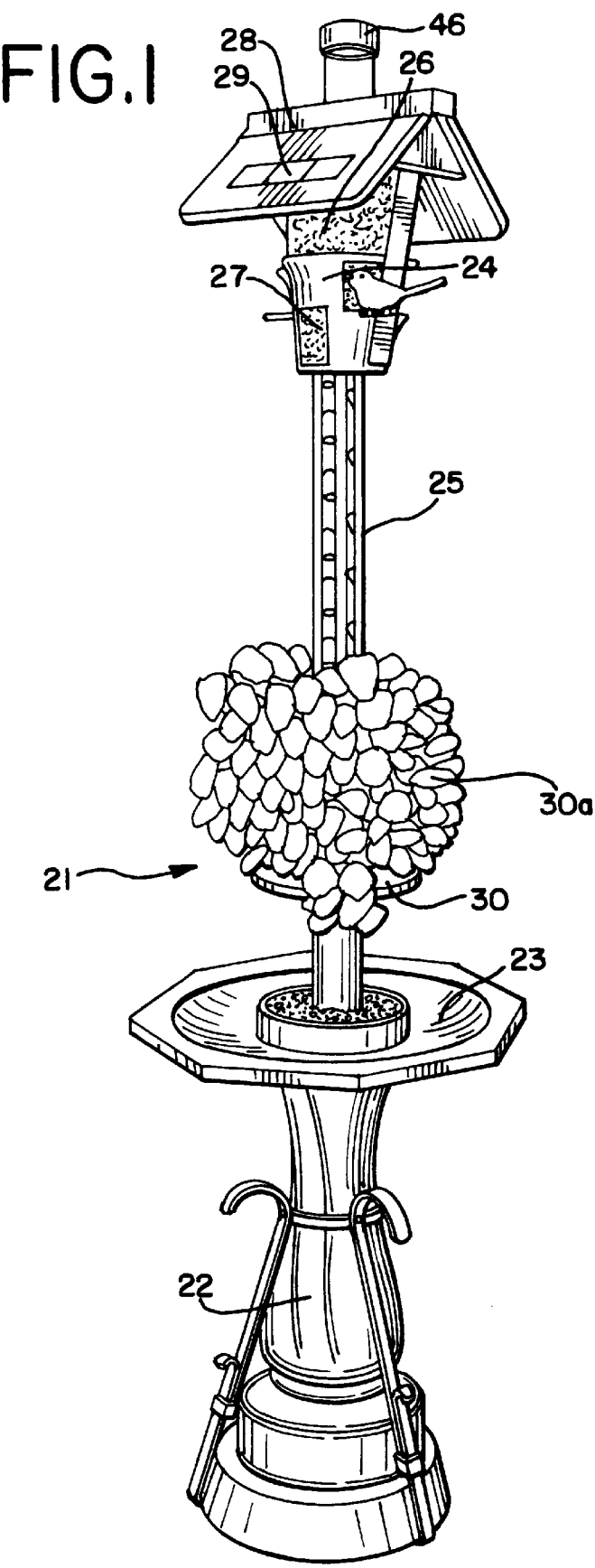
FIG. 1 is a perspective view illustrating an embodiment of the invention which incorporates a bird bath feature.

An embodiment of the feeder device is generally designated at 21 in FIG. 1. This embodiment is especially designed for bird feeding. Included is a storage compartment 22 which is ground engaging. This storage compartment can include a bath area 23, which can be optional. Area 23 is in essence an open trough within which water can be filled. An elevated feed station 24 is shown in this embodiment mounted above the storage compartment 22. This feed station includes a mount 62 (FIG. 2A) for supporting a feed access unit. A tower or tube 25 joins the storage compartment to the feed station and also provides support for the feed station. An optional decorative planter 30 can be included, shown holding a floral arrangement 30a.

The illustrated feed station includes a food access chamber 26. Birds and the like obtain the food through access stations or ports 27. A protective roof assembly 28 is also provided. Replaceable or rechargeable batteries can be positioned within the roof assembly. Also, solar panels 29 can be conveniently located on this roof assembly. In the illustrated embodiment, the tower or tube 25 or a coaxial cap member thereof 46 projects beyond the roof assembly 28, such as through a circular opening within the roof assembly.

Referring particularly to FIG. 2 or to FIG. 2A, the operation of the device is generally discussed. Granular material such as feed suitable for birds is filled into the storage compartment 22, such as through neck 31. For convenience, the material which is moved in accordance with this invention will be referred to variously by terms such as feed. A filler cap 40 can also be included. It will be noted that the entirety of the volume of the storage compartment 22 is available for accepting the food. This volume extends from the neck to the bottom of the compartment. In this regard, the tower or tube 25 extends therewithin, preferably in combination with a skirt member 32. A coupling 61 is shown for assisting in secure assembly between storage compartment 22 and tube 25. In a typical arrangement, the storage component 22 provides support for the tube 25.

Figure 8:
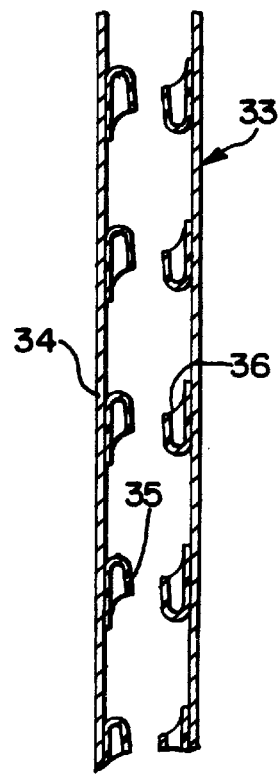
FIG. 8 is a broken-away and enlarged cross-sectional view of the preferred endless belt of the illustrated feed units.

An endless belt, generally designated at 33, is guidingly positioned within the tube 25 and thereabove as needed. Endless belt 33 is a thin and flexible member, typically made of metal. A suitable material out of which the endless belt 33 can be constructed is the metal of a carpenter's tape measure. This takes the form of a band 34 secured to itself in an endless fashion. Band 34 includes a plurality of small container members or cups 35. By way of illustration, such as shown in FIG. 8, these can be fashioned from thumb guards available from office supply stores and the like. These cups 35 each have an open top 36. Granular feed, such as particulate materials or liquids, will enter the small cups 35 through the open top 36. In addition, the feed or other material within each small cup 35 will be deposited into the access chamber 26 when each cup is turned upside down at the top of the endless belt 33, typically accompanied by having the falling feed engage the closed, rounded end 50 of one or more cups 35, thereby spreading the feed. Generally speaking, the feed will thus be moved from an area within the skirt chamber 32, upwardly through the tower or tube 25, and into the access chamber 26. Tube 25 can be opaque, translucent, transparent, or have multiple sections of different or varying capacity or transparency, depending upon the desired location(s) at which the moving endless belt 33 is to be variable.

A drive unit, generally designated at 37, accomplishes the movement of the endless belt 33 in accordance with the invention. Further details of the drive unit 37 of this embodiment are found in FIGS. 3, 4, 5, 6 and 7, as well as in FIGS. 3A, 4A, 5A, 6A and 7A. The drive unit is mounted along the endless belt, preferably above the access chamber 26. The endless belt 33 is drivingly engaged by opposing band control worms 38, 39. A drive motor 41 rotates a drive gear 42 which in turn rotates a driven gear set, generally designated at 43 (FIG. 5). By the intermeshing gears as shown, this driven gear set 43 rotates the control worms 38, 39, one of them in a clockwise direction, and the other in a counterclockwise direction. An extrusion spring 63 (FIGS. 6 and 7) can be provided to assist in properly closing the drive wheels. Also included in the illustrated drive mechanism is a stop limit slot 64. An angular relationship "A" is illustrated, the preferred angle being about 12°.

In the event of an overload, such as when the endless belt 33 is frictionally encumbered by feed, a clutching arrangement is provided. In one of the illustrated embodiments, this includes a spring member, such as at 44, which ceases and/or reverses the driving of the endless belt in order to thereby free up the constriction or cease the feeding operation.

In this illustrated embodiment, a magnet member 45 is provided for temporarily holding the endless belt at the particular location, preferably at or near the drive unit 37a as shown in FIG. 7A. The magnet member 45 is preferably imbedded in a felt pad 47. Magnetic contact is at times made with a stop plate 56, made of ferrous material or the like. When the band 34 is held by the magnet member 45, the opposing length of the endless belt 33 temporarily continues to be driven upwardly by the worm gears 38, 39. As a result, the endless belt will "caterpillar" upwardly, typically until same engages the cap 46 (FIG. 2, 2A) or possibly an elongated divider 48 or 48a which can be positioned within the tube 25. This action is generally illustrated in phantom at the top portion of FIG. 2.

At the same time, of course, the bottom portion of the endless belt 33 also moves upwardly, as generally shown in phantom near the bottom portion of FIG. 2. As a result, feeding typically will cease because the cups will not be in engagement with feed within the storage compartment 22. In addition, when the endless belt 33 engages as noted, this abrupt contact causes disengagement of the magnetic hold of the magnet member 45, and that side of the endless belt 33 drops rapidly. One result of this rapid movement is an automatic dislodgement of a possible obstruction along the endless belt. Another is to keep the feed flow movement within the storage component 22 and assist in gravity flow of feed.

In a preferred embodiment of the endless belt 33, an elongated knurled pad 47 is positioned along an external portion of the band 34. This has been found to assist in loosening feed, particularly within the skirt chamber 32, thereby facilitating entry into the cups 35. A plurality of these elongated knurled pads 47 can be provided as desired. Proper movement of the endless belt 33 is assisted by an elongated divider 48. This is suspended within the tube by an appropriate hanger rod. Divider 48 is preferably transparent so as to not detract from the aesthetic characteristics displayed by the moving endless belt. Divider 48 preferably has bent ends 49, 51 which assist in properly directing the endless belt, especially during the rapid movement and change in location and/or direction of the endless belt 33 during operation of the device.

It has been found that the unit can be powered by a simple dry cell battery or batteries. For example, four "D" sized dry cell batteries can comfortably power the drive motor 41 and its associated drive unit and endless belt. Operation is possible in the milliamp range, and smaller sized batteries can be used, including those of "AAA" and "AA" size. These power supplies are capable of successfully transporting feed when the storage compartment 22 is filled to capacity, for example to 3.5 gallons of mixed bird seed. Power units of larger amperage can be used as the need dictates. Solar power is also suitable.

The unit can be totally automatic once filled and started. Further support can be provided by decorative canes 52, which can be supplemented by ground stakes 53. All of the materials preferably have a pleasing appearance and are made of ultraviolet (UV) resistant materials. Also, adequate free space and venting is provided and associated with the protective roof assembly 28 and the food access chamber 26 such that naturally occurring winds help to remove moisture from the food when it is within the access chamber 26. A wind venturi action is thus provided.

Figure 10:
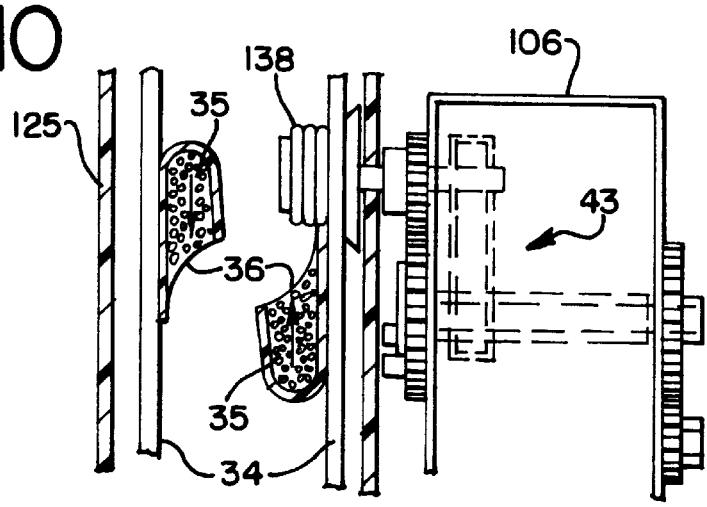
FIG. 10 is a detailed view of the drive assembly of the embodiment shown in FIG. 9.
Figure 9:
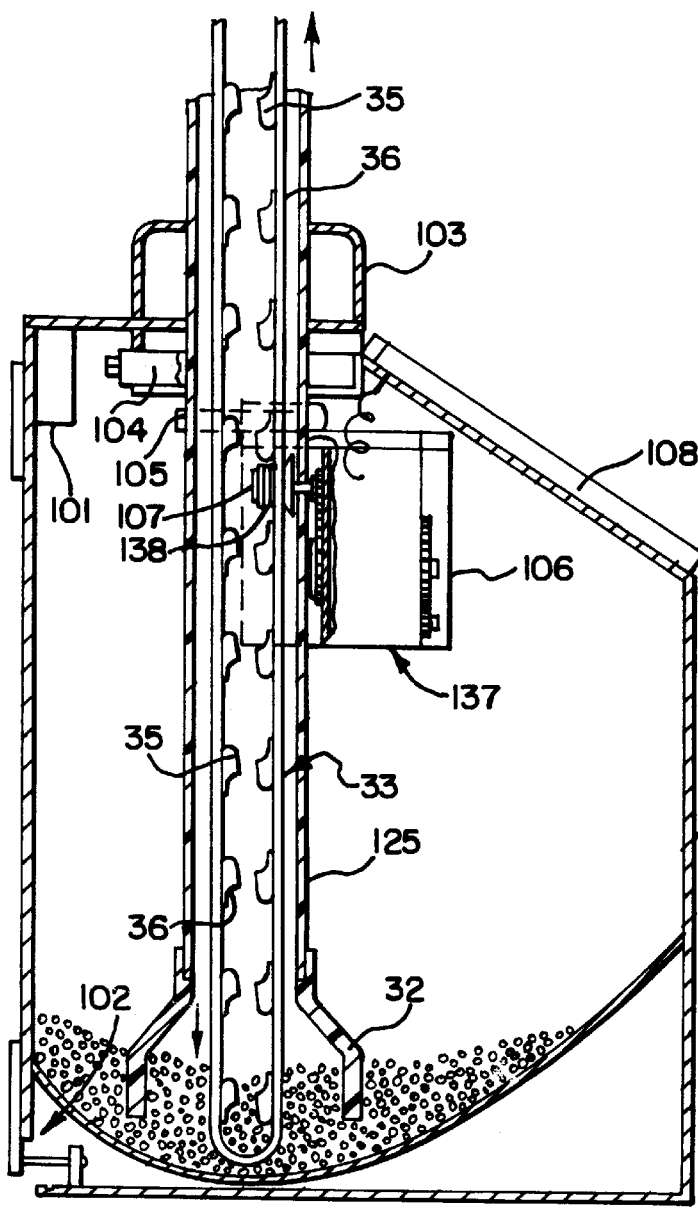
FIG. 9 is an elevational view, with portions broken away and portions in cross-section, of another embodiment.

FIGS. 9 and 10 illustrate another embodiment of the invention. In this embodiment, the storage compartment 25 is mountable to any of a variety of structures, such as by way of mounting assemblies 101, 102. The mountable storage compartment 122 can thus be secured to desired locations, such as from a pole, a mounting frame, the side of a building, or any other suitable structure. With this approach, the device need not rest on the ground, although this embodiment can still so function. When suspended, the entirety of the unit can be at or above eye level. For example, the mountable storage compartment 122 could be below window level and accessible from the window in order to fill feed into the compartment 122, while the feed station, such as elevated feed station 24 shown in FIG. 2A, can be at or above eye level. The tube 125 enclosed endless belt 33 as in the other embodiments. Tube 125 as secured to the mountable storage compartment 122 by any suitable means. Preferably, this is accomplished in a water-tight manner, such as illustrated generally by the holding and sealing assembly 103. Typically this will include a clamp 104 to prevent vertical slippage of the tube 125 with respect to the holding assembly 103.

In this embodiment, the driving mechanism is supported by the tube 125 itself. Attachment means such as a clamp 105 to secure a drive unit, generally designated at 137, onto the tube 125. The operation of drive unit 137 is basically the same as that of drive unit 37 or 37a. Drive 137 differs in that its worm gears 138 are external of the housing 106 containing the drive motor and drive gearing. It will be appreciated that an opening 107 is provided through the tube 125 in this embodiment in order to allow passage of worm gears into the interior of the tube 125 so as to drivingly engage the endless belt 33.

In use, the motor of the drive unit 137 will rotate the worm gears 138, and the endless belt 33 will begin to move the feed until the cups 35 begin to fill and work their way upwardly in order to fill the feed station 24 as generally described. While power can be supplied by any suitable means, such as batteries, transformed alternative current, solar power and the like, a solar panel is illustrated generally in FIG. 9. This supplies power to the motor in accordance with generally known principles. When solar power is used, this can provide a natural approach for stopping the movement of the endless belt 33 when use of the device is not normally expected. The unit will generally run during the daylight hours in order to fill the feed station as required. Of course, manual override means can be provided, if needed in order to cease or begin operation. A combination of solar power and one of the other power sources is also possible. In those instances where automatic shut-off is to be assured, a suitable photocell 109 can be included in order to signal the drive unit to cease operating when a predetermined feed level is achieved. It will be appreciated that the feed can be added to the interior of the storage compartment 122 by any suitable approach by providing an opening door 108 or access chute or tube (not shown). It will be appreciated that the drive 137 can be mounted anywhere along the free area of the tube 125 and not necessarily within the storage compartment 122 itself as shown in FIG. 9.

It will be understood that the embodiments of the present invention which have been described are illustrative of some of the applications of the principles of the present invention. Numerous modifications may be made by those skilled in the art without departing from the true spirit and scope of the invention.

I claim:

1. A feeder apparatus, comprising:
   a support assembly for the apparatus;
   a generally vertically oriented tube having an elongated open interior, said tube being supported by said support assembly;
   an endless belt positioned within said elongated open interior of the tube, said endless belt having at least one receptor member;
   a storage compartment for containing feed material;
   a drive assembly which drivingly engages said endless belt to convey said endless belt along a path which includes at least an elongated length portion of the tube, and said path passes along said storage compartment such that said endless belt carries a portion of the feed material; and
   a feed receptor station which is remote from said storage compartment and which is positioned to receive the feed material from said endless belt.

2. The feeder apparatus in accordance with claim 1, wherein said endless belt has more than one receptor member which is generally cup-shaped.

3. The feeder apparatus in accordance with claim 1, wherein said endless belt includes a thin and flexible member which carries said at least one receptor member.

4. The feeder apparatus in accordance with claim 3, wherein said endless belt is a metal band.

5. The feeder apparatus in accordance with claim 2, wherein the receptor member is mounted such that an open mouth thereof is generally upwardly directed when the endless belt moves in an upward direction and is generally downwardly directed when the endless belt moves in a downward direction.

6. The feeder apparatus in accordance with claim 1, wherein said feed receptor station has an access chamber which receives the feed material and which can be accessed by a bird.

7. The feeder apparatus in accordance with claim 1, wherein said feed receptor station is above said storage compartment.

8. The feeder apparatus in accordance with claim 1, further including a skirt member within said storage compartment, which skirt member is at an interface with a bottom portion of the tube.

9. The feeder apparatus in accordance with claim 1, wherein at least a portion of said tube is transparent.

10. The feeder apparatus in accordance with claim 1, wherein said drive assembly is mounted along the tube and includes a worm gear assembly which drivingly engages said endless belt.

11. The feeder apparatus in accordance with claim 10, wherein said drive assembly further includes a clutch for stopping or reversing the direction of the endless belt.

12. The feeder apparatus in accordance with claim 1, further including a magnetic member at the drive assembly in order to temporarily hold a portion of said endless belt during movement of the endless belt by the drive assembly.

13. The feeder apparatus in accordance with claim 1, further including an elongated knurled pad positioned along an external portion of the endless belt.

14. The feeder apparatus in accordance with claim 1, further including an elongated divider positioned within the tube and positioned inside the circuitous path of the endless belt, said elongated divider having a length which is less than that of the endless belt.

15. The feeder apparatus in accordance with claim 1, wherein said drive assembly is powered, and the apparatus includes one or more solar panels.

16. The feeder apparatus in accordance with claim 1, wherein said storage compartment is associated with a trough for receiving water.

17. The feeder apparatus in accordance with claim 1, further including a mounting member for securing the feed receptor to an additional supporting structure.

18. The feeder apparatus in accordance with claim 1, wherein said drive assembly is mounted along a selected location of the tube.

19. The feeder apparatus in accordance with claim 10, wherein said drive assembly is mounted along a selected location of the tube, and wherein said worm gear assembly enters said tube through an opening in the tube and engages the endless belt.

20. The apparatus in accordance with claim 1, further including a photocell at said feed receptor station, said photocell being in operative communication with said drive assembly in order to cease operation of said drive assembly when a predetermined level of feed material has been deposited into the feed receptor station.

21. A feeder apparatus, comprising:

a support assembly for the apparatus;

a generally vertically oriented tube having an elongated open interior, said tube being supported by said support assembly;

an endless belt positioned within said elongated open interior of the tube, said endless belt having at least one receptor member;

a storage compartment for containing feed material;

a drive assembly which drivingly engages said endless belt to convey said endless belt along a path which includes at least an elongated length portion of the tube, and said path passes along said storage compartment such that said endless belt carries a portion of the feed material;

a feed receptor station which is remote from said storage compartment and which is positioned to receive the feed material from said endless belt;

said endless belt has more than one receptor member which is generally cup-shaped, said endless belt includes a thin and flexible member which carries said receptor member, said endless belt is a metal band; and said receptor member is mounted such that an open mouth thereof is generally upwardly directed when the endless belt moves in an upward direction and is generally downwardly directed when the endless belt moves in a downward direction.

22. A feeder apparatus, comprising:

a support assembly for the apparatus;

a generally vertically oriented tube having an elongated open interior, said tube being supported by said support assembly;

an endless belt positioned within said elongated open interior of the tube, said endless belt having at least one receptor member;

a storage compartment for containing feed material;

a drive assembly which drivingly engages said endless belt to convey said endless belt along a path which includes at least an elongated length portion of the tube, and said path passes along said storage compartment such that said endless belt carries a portion of the feed material;

a feed receptor station which is remote from said storage compartment and which is positioned to receive the feed material from said endless belt;

said drive assembly is mounted along the tube and includes a worm gear assembly which drivingly engages said endless belt; and an elongated divider is positioned within the tube and positioned inside the circuitous path of the endless belt, said elongated divider having a length which is less than that of the endless belt.

* * * * *